United States Patent [19]

Bottasso et al.

[11] 4,207,133

[45] Jun. 10, 1980

[54] TIRE-BUILDING DRUM

[75] Inventors: Franco Bottasso, Milan; Giorgio Bertoldo, Arese, both of Italy

[73] Assignee: Industrie Pirelli, S.p.A., Milan, Italy

[21] Appl. No.: 889,021

[22] Filed: Mar. 22, 1978

[30] Foreign Application Priority Data

Mar. 31, 1977 [IT] Italy ........................ 21872 A/77

[51] Int. Cl.[2] ........................ B29H 17/16

[52] U.S. Cl. ........................ 156/415; 156/416

[58] Field of Search ........................ 156/414, 415, 416, 417, 156/418, 419, 420; 157/1.1-2; 211/19, 20, 23, 24; 425/38; 224/42.12-42.19

[56] References Cited

U.S. PATENT DOCUMENTS

| | | | |
|---|---|---|---|
| 3,518,149 | 6/1970 | Mirtain | 156/416 |
| 3,922,187 | 11/1975 | Nardis | 156/415 |
| 3,925,141 | 12/1975 | Caretta | 156/416 |
| 4,011,126 | 3/1977 | Eichholz et al. | 156/416 |
| 4,090,909 | 5/1978 | Christie et al. | 156/414 |
| 4,105,486 | 8/1978 | Cantarutti | 156/126 |

FOREIGN PATENT DOCUMENTS 1207067 9/1970 United Kingdom .

*Primary Examiner*—John E. Kittle
*Attorney, Agent, or Firm*—Stevens, Davis, Miller & Mosher

[57] ABSTRACT

An expandible tire-building drum for making toric shaped tire carcasses built in the form of cylindrical sleeves is provided. The cylindrical sleeves have at their extremities, annular bulges which are circumferentially inextensible and are radially developed towards the inside. These bulges form the beads on the carcass. The height of the bead is one-half the difference between the internal diameter of the said sleeve and the internal diameter of the said bead. The drum comprises two co-axial discs, constituted substantially by a hub and an annular flange fixed to the hub, axially slidable reciprocally and fixed with each other in rotation. The said discs are supported on a rotating shaft which projects in cantilever fashion from a driving device. The discs comprise a radially external surface having a first part, capable of receiving the beads of the sleeve, and being defined as "bead-seat". The discs also have an annular co-axial ridge with an external diameter greater than the diameter of the said bead-seat disposed alongside the said seat on the part that is axially inside with respect to the said drum. The drum is characterized by the fact that in the said discs, the radially external surface comprises a second part having a frustoconical form that converges axially outside the drum, coinciding also along its axial inner border, with the axially outer border of the said bead-seat. The annular ridge, projects in cantilever fashion, from the disc axially towards the drum interior, the plane perpendicular to drum axis and tangent to the border axially inside the annular ridge resulting axially innermost of the plane perpendicular to the drum axis and tangent to the axially inner surface of the annular flange.

5 Claims, 2 Drawing Figures r p n m C 9 8 7 7 6 8 B 1 4 3 5 3 4 2 h H

TIRE-BUILDING DRUM

The present invention relates to a tire-building drum, and more particularly, a drum of the so-called "expandible" type used for shaping a vehicle tire carcass into a toric form even if, when still incomplete, it has been previously shaped into a cylindrical sleeve.

Tire-building with an expandible drum is well-known in the art so no detail description of the method of building a tire on such a drum is given. It must only be remembered that it essentially comprises two, well-distinct operative steps and is usually referred to as the "two-step method of building tires".

During the first of these steps, and on a suitable type of drum, there is prepared a cylindrical sleeve of a tire carcass having a carcass ply or plies turned-up at their ends around metallic reinforcing bead-wire cores and various other component parts except for the tread and of the breaker structure.

In the second step of the method, a sleeve is first shaped into a toric form which is substantially similar to the final toric form that the finished tire will have. The tread and an underlying reinforcing breaker, if the latter is required such as in a radial-type tire, are then assembled with the carcass. This assembly and a shaping operation are carried out on a different drum from the one used for the first step; hence, it is less complex and more convenient.

The latter drum, as a matter of fact, in its simplest design has two co-axial discs, axially and reciprocally shiftable, and fast with each other in rotation. The discs are provided on their circumferential surface with suitable devices defined as "bead-seats", onto which are fitted exactly the carcass bead.

The shaping step is carried out by reciprocally approaching the two discs and the sleeve beads. Simultaneously, fluid under pressure is injected into the interior of the drum, thus causing radial expansion—i.e. the toric conformation of the sleeve.

It is useful to remember here, that during the shaping operation, the carcass beads exert first, axial thrusts in the direction of the drum interior. When the carcass has thus acquired a certain toric conformation, these toric thrusts are inverted, to remain axially directed towards the outside, as the shaping proceeds.

Naturally, if the connection between sleeve bead and the corresponding bead-seat is not fluid-tight, the discs have to be joined together with a suitable expandible tubular air-tube which provides such a "fluid-tight" connection.

Finally, there are then the devices constituting the bead-seats that constitute the complex drum element. As a matter of fact, these have to guarantee the "fluid-tightness"; they must permit an easy mounting and dismounting of the carcass onto and off the drum; they must also resist the axial thrusts exerted by the beads on the drum itself.

In order that the devices which are as simple as possible, experiments have been carried out with drum having just two co-axial discs on their boundary, with a circumferential shaping suited for constituting a bead-seat and having an annular ridge co-axial with a disc, and projecting radially from the boundary outline of the same, from the axially inner part of the shaping.

The annular ridge resists the thrusts exerted by the beads during the first step of the conformation, and owing to the effect of these, a fluid-tight coupling between disc and carcass is ensured. Instead, for resisting the thrusts in the final step of the conformation, i.e., after the inversion, when it results axially directed toward the outside, some appropriate devices for opposing the beads, are used. These means, defined usually as "bells" or "rings", are already well-known to those skilled in the art, in various forms, as required by the art for their various applications.

These devices are not connected to the type of drum used, but one of these devices is however, indispensible for bringing about the toric conformation of the carcass.

The device used with the drum of the invention, which is neither described herein, nor cited later on in the sequence of the treatment, (since it concerns an aspect of the process of tire-building that lies beyond the limits of this invention), is the particularly advantageous device which is described in Italian Pat. No. 957,079 and the corresponding U.S. Pat. No. 3,925,141 granted Dec. 9, 1975, the disclosure of which is incorporated herein by reference.

Returning to the tire-building drum just mentioned, the prior art drums, afore-mentioned, are not entirely satisfactory in practice.

Above all, the discs must be placed side-by-side at the time of mounting the cylindrical sleeve, to allow one of the sleeve beads to stride over both the annular ridges, naturally foreseeing a temporary, prior elastic formation—i.e. an ovalization of the sleeve bead. This striding over with discs extended is not possible because the carcass does not have a sufficient clearance on the drum.

This total axial closing of the discs, and their subsequent re-opening, requires a certain period of time—this proving to be contra-productive.

Moreover, during the re-opening of the discs, the sleeve, which initially are in a side-by-side position, and not firmly leaning on the discs, must be manually supported by the Operator himself. The same Operator has, besides this, to also manually guide the fitting of the beads onto their respective seats in order to prevent interference, and possible damage to the sleeve itself.

This manual intervention on the part of the Operator, is first of all quite dangerous for his own safety, and in the second place, is economically disadvantageous in relation to the productivity of the machine.

An object of the invention is therefore to provide a tire-building drum of the type described, which solves all the above-mentioned inconveniences, is of simple construction, is quite easy and convenient to use in tire building, and insures the production of a "high quality" product.

The above object and others are accomplished in accordance with the invention by providing an expandible tire-building drum for building a tire having a toric shaped carcass built from a cylindrical sleeve which has annular bulges at its extremities which are circumferentially inextensible and radially developed towards the inside. These bulges are generally known as carcass beads. The height of the bead is about one-half of the difference between the internal diameter of the sleeve and the internal diameter of the bead. The drum has two co-axial discs constituted substantially by a hub and an annular flange fixed to it, axially slidable reciprocally, and fixed to each other for rotation together. The discs are supported on a shaft which projects in a cantilever fashion from the drive mechanism, the discs having a radially external surface comprising a first part capable of receiving the beads of the sleeve, and being defined as "bead-seat"; an annular co-axial ridge, with external diameter greater than the "bead-seat" diameter, being disposed alongside the seat, on the part that is axially inside, with respect to the drum; the drum being characterized by the fact that in the said discs the radially external surface comprises a second part, having a frustoconical form, that converges axially outside the drum, coinciding also along its axially inner border, with the axially outer border of the "bead-seat"; the annular ridge projects in cantilever fashion, from the disc axially towards the drum interior, the plane perpendicular to the drum axis and tangent to the border axially inside the annular ridge, resulting axially innermost of the plane that is perpendicular to the drum axis and tangent to the axially inner surface of the annular flange.

According to an especially convenient embodiment of the above-said drum, the projecting part of the annular ridge is so large, that not only does the plane perpendicular to the drum and tangent to the axially outer edge of the annular ridge result in being axially innermost of the plane tangential to the annular flange of the disc, but this latter plane results as outermost, also to the plane that is tangential to the axial internal edge of the said "bead-seat".

Moreover, the difference between the value of the maximum diameter of the annular ridge, and the value of the minimum diameter of the truncated cone, is always greater than double the height of the bead. As for the frustoconical surface adjacent to the bead-seat, it is quite advantageous to have it knurled. This "knurling" can conveniently be extended to also the radially outer surface of the annular ridge.

In any case, these "knurls" shall, of course, be formed in such a way as to form steel "blocks" or "plats" incised into the smooth radially external surface.

The present invention will be better understood with reference to the following description, together with the attached drawing sheets, wherein.

Figure 1:
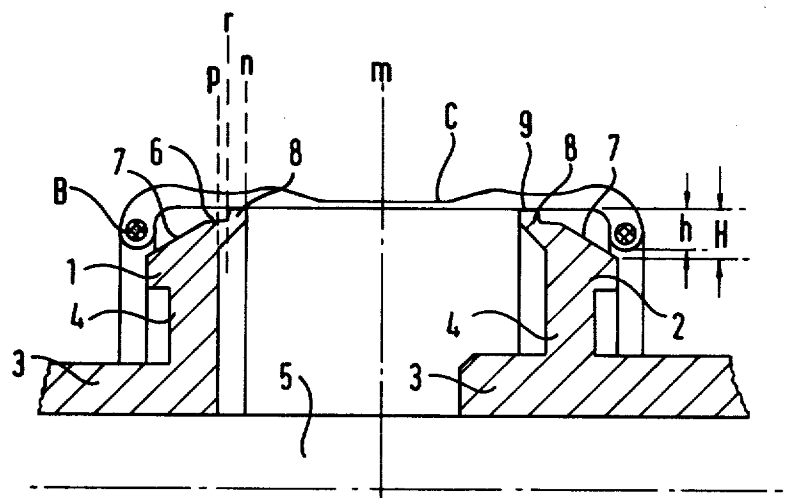
FIG. 1 illustrates in a straight cross-section, the drum according to the invention, on which a cylindrical carcass sleeve has been fitted, ready to be conformed.

With reference to FIG. 1, the drum provided by the invention comprises two discs 1 and 2, each one constituted essentially by a hub 3, made fast with an annular flange 4. The two above-said discs are fitted together on a rotating shaft 5 that projects, in cantilever fashion, from the body of the tire-building machine (not shown) that can be imagined as standing to the right—in the drawing of FIG. 1.

With per se known media (not illustrated), these discs are rendered axially shiftable reciprocally, but fixed with each other in rotation.

FIG. 1 also illustrates a carcass "C"—in the form of a cylindrical sleeve that is already fitted onto the drum prior to the initiating of the shaping operation.

This sleeve, even if known per se, presents at its extremities ring shaped bulges that extend radially, constituted by turning-up the carcass plies around the metallic bead-wire cores "B", and also by various other component parts. These "bulges" that are circumferentially inextensible, are generally known to those skilled in the art as "beads". In the present description, the bead will, from now on, be defined by the measurement "h" (FIG. 1)—for the half-value of the difference between the internal sleeve diameter and the internal diameter of the bead.

As far as the drum is concerned, the definitions "axially inner" and "axially outer", will henceforth be used here, in order to establish the relative position between any two drum elements—with respect to the mid-plane "m".

Now, turning to a detailed examination of the drum discs. On their radial boundary they present a first surface 6, formed in such a way as to constitute a suitable support for the sleeve bead during the shaping process. The form can be selected from several "known" shapes: for example, a concave shape having its concave side radially facing towards the outside; or else (as in FIG. 1) a simple smooth surface, slightly inclined towards the axis, in the axially outward direction, managing in this manner, to realize a "shrinking" of the bead during the shaping process, by taking full advantage of the effect of the above-said axial thrust, and even moreso, favoring the detaching of the bead from its seat, when the shaping is finished.

Adjacent to the first surface, or rather coinciding with it—along the axially external circumferential border, there exists a second surface 7, with a frusto-conical form, converging axially towards the outside. The two surfaces in the illustrated drum, having diverse inclinations on the drum axis; but there is nothing against their being inclined equally, i.e. that they are presented as a single frusto-conical surface, the surface 7 constituting the axial extension outside the also frusto-conical surface 6; the two surfaces having the same genetrix and also being undistinguishable one from the other.

The function of this surface 7, will be discussed later on in the text, in order to clarify the criteria to be adopted for selecting the converging angle which will be most suitable. In the embodiment illustrated, this angle is approximately 30°.

The surface develops axially towards the outside and radially towards the inside, for a tract sufficient for creating a difference between the maximum diameter of the disc, and the diameter of the minor base of the truncated-cone realized by it (said surface) to the value of 2H—greater than double the height of the sleeve bead. In other words, as is clearly represented in FIG. 1 "H" must be greater than "h". A further explanation for this will be given later on in the text.

Flanking the said bead seat, from the axially inner part, there exists next, an annular ridge 8, having an external diameter superior to the maximum diameter of the bead-seat. The annular ridge projects in cantilever fashion, axially towards the interior of the drum, the scope of this being to create an annular cavity in the drum discs—or at least, in the disc adjacent to the body of the tire-building machine, thus to realize the clearance necessary, for being able to fit the corresponding sleeve bead onto the disc, by striding over the rigid annular ridge, without having to reciprocally approach the drum discs too much—and the resulting consequence of a disadvantageous loss of time.

The value of the projecting part, i.e. the depth of the above-said annular cavity, is measured by the axial distance between the plane "n" that is perpendicular to the drum axis and tangent to the axially inner border of the annular ridge 8 and the plane "p" that is parallel to it and tangent to the annular flange on its axially inner surface.

The most convenient value for the projecting part depends upon the global dimensions of the drum, and hence, eventually on the range of carcass measurements that are required to be worked on the same drum.

In the case of the FIG. this value is relatively high. We can, as a matter of fact note that, besides the said plane "n", even the plane "r" that—is perpendicular to the drum axis and tangent to the edge axially inside the bead-seat 6, results as being axially innermost of the plane "p".

We note in this case that, the plane "r" coincides with the plane that is parallel to it and tangent to the axially external border of the annular ridge 8. However, such a condition is absolutely not binding, as the two above-said planes can also be quite distinct, one from the other.

Naturally, in FIG. 1, the planes "m", "n", "r" and "p" perpendicular to the drawing sheet, are indicated with the respective intersecting lines on the said plane.

Figure 2:
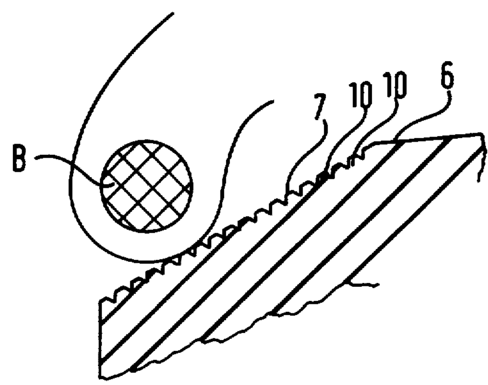
FIG. 2 illustrates a detail of the drum and sleeve bead, during the step of positioning the beads onto their respective seats.

To end with, in the same FIGS. we can observe that the surface 7, represented enlarged in FIG. 2 as also surface 9, radially outside the annular ridge 8, are "knurled". In other words, they are grooved by a fine incising "network" so as to be opportunely but not necessarily, orthogonal one to the other.

The parallel incisions are separated, one from the other, by a certain space that is enough to originate "blocks" 10, having a prismatic trapezoidal form—i.e. presenting an external surface rather than a "spire" as in the usual "knurls".

For understanding the advantages offered by the drum described—as when compared to the "known" drums, the procedure for fitting on the sleeve, is well summarized.

As we have said above, the discs are first positioned approximately in the position of FIG. 1—after a cylindrical sleeve has been first fitted onto disc 1, making the right-hand bead (FIG. 1) to astride the annular ridge of the said disc, and hence, be shifted to the right—i.e. towards the body of the tire-building machine, till the above-said bead is taken against the disc 2.

At this point, even the ridge of this disc is spanned, and the operation is made possible by the presence of the cavity created by the projecting part of the annular ridge on the face that is axially inside the disc 2. In fact, the movements of the sleeve around the discs, possibly with the drums of the state of the art, that are fitted on with the discs side-by-side, are no longer possible any more—because of the interdistance of the discs; but the above-said cavity, allows however, for the sleeve bead, the necessary clearance for carrying out the above-said spanning of the annular ridge.

The sleeve results now, as leaning for a certain tract of the circumferential development, with its internal surface on the external surface of the annular ridge 8.

At this point begins the enlarging of the drum discs, because of said enlarging the annular ridges begin to slide along the above-said corresponding zone of the internal surface of the sleeve.

However, at a certain moment, the sleeve beads come into contact—for a small tract of their development, with the frusto-conical surfaces 7 in the upper part of the drum, and begin to slide along the said surface—moving thus, towards the seats 6, until the sleeve is caused to be completely fitted onto the drum.

One can now, easily understand the importance of the inventive characteristics of these discs.

In the first place, if "H" were not to be greater than "h" (FIG. 1), part of the axially internal surface of the beads, during the enlarging of the discs, would move and abut against the axially external surface of these discs. Moreover, their subsequent further movement instead of determining the fitting of the sleeve, would provoke a mutual axial drawing away even of the beads, localized in the upper half of the drum (as illustrated in FIG. 1) with a consequent irreparable damage to the sleeve itself.

It is clearly impossible that this could happen—when "H" is greater than "h".

The angle of inclination of the frusto-conical surface, must therefore be that which allows for reaching the said condition, maintaining to within acceptable limits the axial dimensions of the discs 2—without it causing an obstacle to the sliding of the bead along the above-said surface.

The existence of this sliding also justifies the knurling of the surface.

As a matter of fact, contrary to what one concludes through intuition, the non-vulcanized rubber, does not flow easily onto the smooth surfaces, but tends to adhere to it—hindering the sliding movement and also creating localized deformations in the sliding element in the zone of contact with the surface in this case the sleeve beads, along the circumferential line advancing onto the frusto-conical surface (FIG. 2).

The applicant has surprisingly verified that this phenomena does not take place indeed, when the surface is "knurled".

In fact, this phenomena of adhesion—usually defined as a "sucker effect" depends—with all probability and according to exponential laws—upon the area of the contacting surfaces; the "knurling" sub-dividing this total area into many small areas, actually prevents the establishing of this phenomena with its subsequent damaging effects.

Naturally, what has to be prevented is for the knurled surface to damage the above-said bead; which expedient can be assured by carrying out the "knurling" by means of special contrivances, or, in other words, by making a network of fine incisions on the surface, as a rule with triangular sections having their vertex facing downwards, and placed perpendicular one to the other, with being conveniently separated. The result of this is made up of a system of blocks or plats (FIG. 2) having a prismatic trapezoidal form, instead of pyramidal (i.e. it has spires), as is usually the case.

It is clear, that the lack of these spires prevents the deteriorating of the sliding bead surface.

Naturally, what has just been said regarding the sliding of the beads, also applies identically to the already-said sliding of the internal surface of the sleeve of the annular ridges 8—the utility of "knurling" with the same characteristics, also the radially outer surface of the said annular ridges, can well be understood.

Proceeding then, with the said mutual axial drawing away of the discs, at a certain moment the sleeve beads move onto the corresponding bead seat 6, where they undergo a shrinking owing to the inclination effect of the said seat on the drum axis. This shrinking determines the exact centering of the sleeve.

Moreover, the above-said shrinking, together with what is determined between the axially inner surface of the bead and the axially outer surface of the annular ridge—owing to the above-said axial thrusts, guarantees a secure fluid-tight coupling between the sleeve bead and the corresponding drum seat.

At this point, the axial mutual drawing away of the drum discs, is stopped, and then reversed—giving rise to a mutual axial approaching of the discs, and with this, the real and proper shaping operation for the carcass, which proceeds in a way already known per se.

It is understood that the above description and the accompanying drawings, are merely by way of non-limiting example, and that the said invention includes within its scope any other modification, or alternative embodiments based upon the above-indicated inventive principle, which are accessible to any technician of this field.

What is claimed is:

1. An expandable tire-building drum for making toric shaped tire carcasses built in the form of cylindrical sleeves, each said cylindrical sleeve having at opposite extremities, respective annular bulges circumferentially inextensible and radially developed towards the sleeve interior forming the beads of the carcass, the height of the beads being one-half of the difference between the internal diameter of the said sleeve and the internal diameter of said beads, said drum comprising two co-axial discs, each comprising a hub and an annular flange fixed to the hub, said discs being axially slidable reciprocally and fixed with each other in rotation, said discs being supported by a rotating shaft which projects in cantilever fashion from a driving device, each of said discs further comprising: a radially external surface comprising a first part having a truncated conical shape and capable of receiving a respective bead of the sleeve and acting as a bead-seat; an annular co-axial ridge of a predetermined height having an external diameter greater than the diameter of said beat-seat and being disposed alongside said seat on the innermost portion of said flange, said annular ridge projecting in cantilever fashion from said disc axially towards the drum interior such that a plane perpendicular to said drum axis and tangent to the axial inside border of said annular ridge is axially innermost of a plane perpendicular to the drum axis and tangent to the axially inner surface of the said annular flange, the height of said annular co-axial ridge being less than the height of said beads; and, a second part having a form of a truncated cone that converges axially outside said drum, coinciding also along its axial inner border, with the axially outer border of said bead-seat, the difference between the value of the greater diameter of the said annular ridge and the value of the lesser diameter of said truncated cone, being greater than twice the value of the said bead height, the truncated cone having a surface which is knurled, wherein said knurling procedures blocks of material, the radially external surfaces of which are smooth.

2. A drum according to claim 1, characterized by the fact that a perpendicular plane of the drum axis which is tangent to the axially outer border of said annular ridge is axially inside the said plane that is tangent to the annular flange inner surface.

3. A drum according to claim 2, characterized by the fact that the said bead-seat projects partially at least, in cantilever fashion, from a respective disc, the plane perpendicular to the drum and tangent to the axially inner border of the said bead-seat being axially innermost of the said plane tangent to the annular flange.

4. The drum of claim 1 wherein said truncated cone has a surface which constitutes the external axial prolongation of the surface of said truncated conically shaped bead-seat, said two truncated-cone surfaces having the same generatrix.

5. The drum of claim 1 wherein the radially external surface of the said annular ridge is knurled.

* * * * *